United States Patent [19]
Kato

[11] Patent Number: 5,109,299
[45] Date of Patent: Apr. 28, 1992

[54] ZOOM LENS SYSTEM

[75] Inventor: Shigeru Kato, Tokyo, Japan

[73] Assignee: Olympus Optical Co., Ltd., Tokyo, Japan

[21] Appl. No.: 671,515

[22] Filed: Mar. 19, 1991

[30] Foreign Application Priority Data

Mar. 19, 1990 [JP] Japan .................................. 2-66779

[51] Int. Cl.$^5$ ........................................... G02B 15/14
[52] U.S. Cl. ................................................ 359/692
[58] Field of Search ..................... 350/423, 427, 432

[56] References Cited
U.S. PATENT DOCUMENTS 4,838,669 6/1989 Ogata et al. .

FOREIGN PATENT DOCUMENTS

64-52111 1/1989 Japan .

Primary Examiner—Bruce Y. Arnold
Assistant Examiner—Rebecca D. Gass
Attorney, Agent, or Firm—Cushman, Darby & Cushman

[57] ABSTRACT

A zoom lens system comprising a front lens unit which is composed of a positive meniscus lens component having a convex surface on the object side, a negative lens component and at least one positive lens component, and has a positive refractive power as a whole, and a rear lens unit which is composed of a positive lens component, a biconcave lens component and a negative meniscus lens component having a convex surface on the image side, and has a negative refractive power as a whole; and adapted so as to perform variation of focal length by varying the airspace reserved between said front lens unit and said rear lens unit.

5 Claims, 13 Drawing Sheets

ZOOM LENS SYSTEM

BACKGROUND OF THE INVENTION a) Field of the invention

The present invention relates to a zoom lens system which has a short total length and is suited for use especially with lens shutter cameras, etc.

b) Description of the prior art

As the conventional zoom lens system which has a range of field angles covering the standard field angle (on the order of $2\omega=47°$) and a vari-focal ratio on the order of 2, and is designed so compact as to be built in the lens shutter cameras, there is known the zoom lens system composed of a front lens unit having a positive refractive power and another lens unit having a negative refractive power.

This zoom lens system is characterized in that it has a composition similar to that of the telephoto type lens system, thereby permitting shortening the total length thereof. As a conventional example of the zoom lens system having the composition described above, there is known the lens system disclosed by Japanese Patent Kokai Publication No. Sho 64-52111 (U.S. Pat. No. 4,838,669) which has aberrations corrected with good balance and a shortened total length.

This type of zoom lens system has a short back focal length and comprises a rear lens unit located close to the image surface, thereby having a defect that the lens components arranged in the rear lens unit have large diameters. Speaking concretely, the lens components arranged in the rear lens unit have diameters which are approximately twice as large as those of the lens components arranged in the front lens unit, thereby enhancing manufacturing cost of the lens components arranged in the rear lens unit.

SUMMARY OF THE INVENTION

A primary object of the present invention is to provide a compact zoom lens system which covers the standard field angle, has a vari-focal ratio on the order of 2 and favorably corrected aberrations, and can be manufactured at a low cost.

The zoom lens system according to the present invention comprises a front lens unit having a positive refractive power and a rear lens unit having a negative refractive power, and adapted so as to perform variation of focal length by varying the airspace reserved between these lens units. In the zoom lens system according to the present invention, the front lens unit comprises, in the order from the object side, a positive meniscus lens component having a convex surface on the object side, a negative lens component and at least one positive lens component, and the rear lens unit comprises, in the order from the object side, a positive lens component, a biconcave lens component and a negative meniscus lens component having a convex surface on the image side. The zoom lens system according to the present invention is characterized in that the positive lens component and the biconcave lens component arranged in said rear lens unit are made of plastic materials, said plastic lens components comprise at least one aspherical surface which has positive refractive power strengthened as the surface portions are farther from the optical axis, and that the rear lens unit is designed so as to satisfy the following conditions (1) and (2):

$$-1 < (r_{II2a} + r_{II2b})/(r_{II2a} - r_{2b}) < 0.2 \tag{1}$$

$$-0.15 < f_{II}/f_{II12} < 0.15 \tag{2}$$

wherein the reference symbols $r_{II2a}$ and $r_{II2b}$ represent the radii of curvature on the object side surface and the image side surface respectively of the biconcave lens unit, the reference symbol $f_{II}$ designates the focal length of said rear lens unit, and the reference symbol $f_{II12}$ denotes the total focal length of the two plastic lens components.

In the zoom lens system according to the present invention, curvature of field is corrected by arranging at least one aspherical surface in the rear lens unit wherein the axial ray and the offaxial ray are separated from each other.

The condition (1) defines the shape of the biconcave lens component arranged in the rear lens unit. If the upper limit of the condition (1) is exceeded, said biconcave lens component will have too weak a refractive power and cannot correct the curvature of field sufficiently. If the lower limit of the condition (1) is exceeded, said lens component will not be the biconcave lens component but will have a meniscus shape, thereby shortening the distance as measured from the final surface of the zoom lens system to the image surface. That is to say, when said lens component has the meniscus shape, the rear principal point of the zoom lens system is shifted toward the object side, thereby bringing the final surface of the zoom lens system closer to the image surface and enlarging the diameter of the lens component arranged on the most image side.

The condition (2) is adopted for shortening the distance of the shift of the focal point of the zoom lens system which is caused due to variations of temperature and humidity especially of the plastic lens components. Speaking concretely, when the total refractive power of the positive plastic lens component and the negative plastic lens component is weakened, these lens components will have refractive powers which are nearly equal to each other in the absolute values thereof and, since the variations of temperature and humidity cause variations of the refractive powers of the positive lens component and the negative lens component which are in the directions reverse to each other and nearly equal to each other in the absolute values thereof, the total refractive power will be scarcely varied and the focal point of the zoom lens system is shifted only for a very short distance due to the variations of temperature and humidity.

If the upper limit or the lower limit of the condition (2) is exceeded, variations of temperature and humidity will remarkably vary the total refractive power of the two plastic lens components and shift the focal point of the zoom lens system for a long distance, thereby bringing the zoom lens system out of focus.

In order to correct aberrations more favorably in the zoom lens system according to the present invention, it is desirable to specify the upper limit of the above-mentioned condition (2) at 0.03. That is to say, it is more desirable to design the rear lens unit so as to satisfy the following condition (2'):

$$-0.15 < f_{II}/f_{II12} < 0.13 \tag{2}$$

If the upper limit of the condition (2') is exceeded, the focal point of the zoom lens system will be shifted for a shorter distance by the variations of temperature and humidity, but it will be difficult to properly balance aberrations with one another in the zoom lens system or obtain good image quality.

For the zoom lens system according to the present invention, it is desirable to fabricate the two plastic lens component from one and the same material, and design the rear lens unit so as to satisfy the following condiitons (3) through (5):

$$1 \leq |f_{III}/f_{II}| \leq 4 \qquad (3)$$

$$1 \leq |f_{II2}/f_{II}| \leq 4 \qquad (4)$$

$$-0.8 < (r_{II1b} - r_{II2a})/(r_{II1b} + r_{II2a}) < 0 \qquad (5)$$

wherein the reference symbol $f_{II}$ represents the focal length of the rear lens unit, the reference symbol $f_{II1}$ designates the focal length of the positive plastic lens component arranged in the rear lens unit, the reference symbol $f_{II2}$ denotes the focal length of the biconcave plastic lens component arranged in the rear lens unit, the reference symbol $r_{II1b}$ represents the radius of curvature on the image side surface of the positive lens component arranged in the rear lens unit and the reference symbol $r_{II2a}$ designates the radius of curvature on the object side surface of the biconcave plastic lens component arranged in the rear lens unit.

These two plastic lens components should desirably be fabricated from one and the same material so that the variations of the characteristics of these lens components due to variations of temperature will be cancelled with each other. When these lens components are fabricated from one and the same material, the condition (2) exhibits a higher effect to shorten the distance of the shift of the focal point of the zoom lens system to be caused by variations of temperature and humidity.

The conditions (3) and (4) define the focal lengths of the plastic lens components arranged in the rear lens unit. If the lower limit of the condition (3) or (4) is exceeded, the refractive powers of the positive plastic lens component and the negative plastic lens component will be varied remarkably due to variation of temperature, thereby allowing the total focal length of these positive and negative plastic lens components to be varied due to temperature variation. If the upper limit of the condition (3) or (4) is exceeded, these plastic lens components will produce aberrations in smaller mounts or contribute less to correction of aberrations with good balance in the zoom lens system as a whole, thereby making it impossible to correct aberrations with good balance in the zoom lens system as a whole.

The condition (5) defines the shape of the air lens formed between the two plastic lens components. If the lower limit of the condition (5) is exceeded, spherical aberration of high orders will be produced remarkably on the negative side. If the upper limit of the condition (5) is exceeded, the positive plastic lens component will produce aberrations in too small amounts relative to those of the aberrations produced in the rear lens unit, thereby making it impossible to correct aberrations favorably in the zoom lens system as a whole.

For the zoom lens system according to the present invention, it is desirable to compose the front lens unit, in the order from the object side, of a positive meniscus lens component having a convex surface on the object side, a negative lens component and two positive lens components having convex surfaces on the image side, and further design the front lens unit so as to satisfy the following condition (6):

$$-2.4 < (r_{I2b} - r_{I3a})/(r_{I2b} + r_{I3a}) \qquad (6)$$

wherein the reference symbol $r_{I2b}$ represents the radius of curvature on the image side surface of the negative lens component arranged in the front lens unit and the reference symbol $r_{I3a}$ designates the radius of curvature on the object side surface of the positive lens component which is arranged on the image side of said negative lens component and adjacent thereto.

The condition (6) defines the shape of the air lens formed between the negative lens component and the positive lens component which is arranged on the negative lens component and adjacent thereto in the front lens unit. If the lower limit of the condition (6) is exceeded, spherical aberration of high orders will be produced remarkably on the positive side. This spherical aberration of high orders will be produced more remarkably at the tele position.

Further, it is more desirable, from the viewpoint of manufacturing of the two lens components forming the air lens, to add an upper limit to the condition (6) so as to define the following condition (6') and design the front lens unit so as to satisfy the condition (6'):

$$-2.4 < (r_{I2b} - r_{I3a})/(r_{I2b} + r_{I3a}) < -0.5 \qquad (6)$$

If the upper limit of the condition (6') is exceeded, the optical performance of the zoom lens system will be largely influenced by manufacturing errors of the negative lens component and the positive lens component which form said air lens, thereby making it necessary to specify stricter precision for molding and assembly of the parts of the zoom lens system or enhancing manufacturing cost of the zoom lens system.

DETAILED DESCRIPTION OF THE PREFERRED EMBODIMENTS

Now, the present invention will be described more detailedly below with reference to the preferred embodiments illustrated in the accompanying drawings and given in the form of the following numerical data:

Embodiment 1

Figure 1:
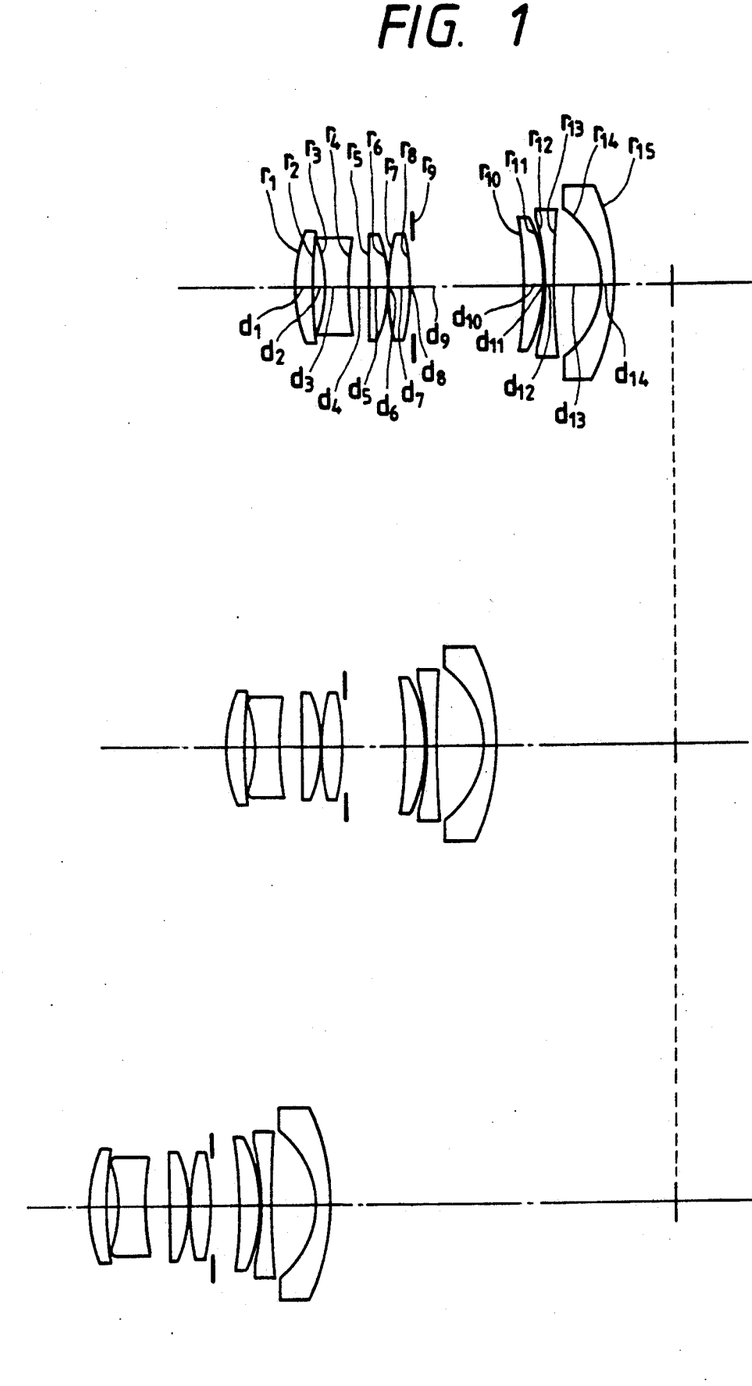
FIG. 1 through FIG. 5 show sectional views illustrating compositions of Embodiments 1 through 5 of the zoom lens system according to the present invention.

$f = 39.348 \sim 77.196$ mm, F/4.65~F/6.62
$2\omega = 148.690° \sim 122.398°$

| | | | |
|---|---|---|---|
| $r_1 = 20.7232$ | | | |
| | $d_1 = 2.3325$ | $n_1 = 1.71300$ | $\nu_1 = 53.84$ |
| $r_2 = 86.5597$ | | | |
| | $d_2 = 1.5167$ | | |
| $r_3 = -22.5439$ | | | |
| | $d_3 = 3.1266$ | $n_2 = 1.83400$ | $\nu_2 = 37.16$ |
| $r_4 = 40.6080$ | | | |
| | $d_4 = 2.9170$ | | |
| $r_5 = -603.1115$ | | | |
| | $d_5 = 2.5863$ | $n_3 = 1.58313$ | $\nu_3 = 59.36$ |
| $r_6 = -18.4149$ | | | |
| | $d_6 = 0.1500$ | | |
| $r_7 = 33.0165$ | | | |
| | $d_7 = 2.5265$ | $n_4 = 1.50137$ | $\nu_4 = 56.40$ |
| $r_8 = -44.5971$ | | | |
| | $d_8 = 0.8000$ | | |
| $r_9 = \infty$ (stop) | | | |
| | $d_9 = D$ (variable) | | |
| $r_{10} = -65.8544$ (aspherical surface) | | | |
| | $d_{10} = 2.5259$ | $n_5 = 1.50050$ | $\nu_5 = 56.68$ |
| $r_{11} = -21.6372$ | | | |
| | $d_{11} = 0.3575$ | | |
| $r_{12} = -40.4041$ | | | |
| | $d_{12} = 1.3127$ | $n_6 = 1.50050$ | $\nu_6 = 56.68$ |
| $r_{13} = 176.9470$ | | | |
| | $d_{13} = 6.0356$ | | |
| $r_{14} = -12.4911$ | | | |
| | $d_{14} = 1.6000$ | $n_7 = 1.74100$ | $\nu_7 = 52.68$ |
| $r_{15} = -30.2214$ | | | | aspherical surface coefficients

$K = 1.0000, A = 0, B = 0.13944 \times 10^{-4}$
$C = 0.69628 \times 10^{-7}, D = -0.46929 \times 10^{-12}$

| f | 39.348 | 55.104 | 77.196 |
|---|---|---|---|
| D | 14.390 | 7.747 | 3.000 |
| $f_B$ | 7.546 | 23.372 | 45.559 |

$(r_{II2a} + r_{II2b})/(r_{II2a} - r_{II2b}) = -0.628$
$f_{II}/f_{II2} = -0.015, |f_{III}/f_{II}| = 2.085$
$|f_{III}/f_{II}| = 2.165,$
$(r_{III b} - r_{II2a})/(r_{III b} + r_{II2a}) = -0.302$
$(r_{I2b} - r_{I3a})/(r_{I2b} + r_{I3a}) = -1.144$

Embodiment 2

Figure 2:
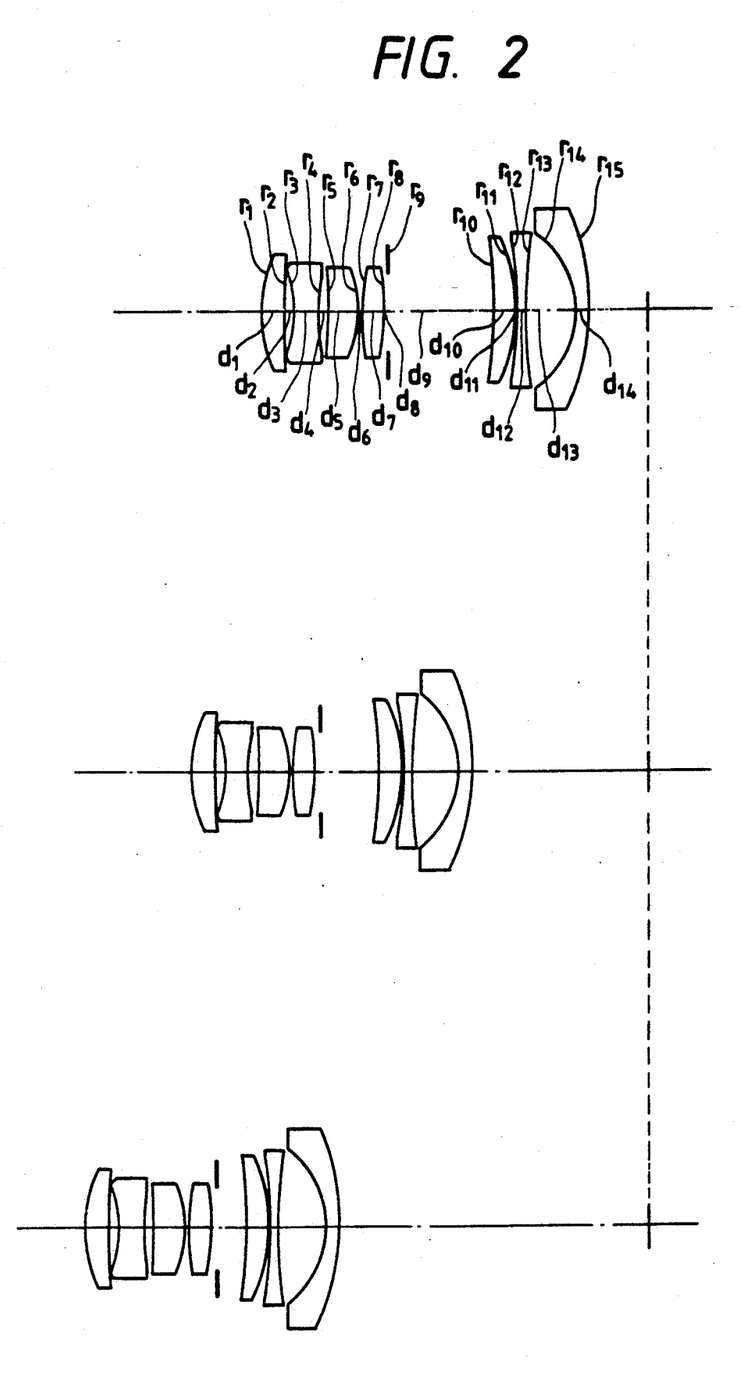

$f = 39.332 \sim 73.335$ mm, F/3.997~F/7.452
$2\omega = 147.130 \sim 122.378$

| | | | |
|---|---|---|---|
| $r_1 = 17.9351$ | | | |
| | $d_1 = 2.9960$ | $n_1 = 1.56384$ | $\nu_1 = 60.69$ |
| $r_2 = 102.4003$ | | | |
| | $d_2 = 1.4236$ | | |
| $r_3 = -21.1329$ | | | |
| | $d_3 = 3.0186$ | $n_2 = 1.83400$ | $\nu_2 = 37.16$ |
| $r_4 = 38.1165$ | | | |
| | $d_4 = 1.1754$ | | |
| $r_5 = -496.2130$ | | | |
| | $d_5 = 4.0961$ | $n_3 = 1.48749$ | $\nu_3 = 70.20$ |
| $r_6 = -16.1071$ | | | |
| | $d_6 = 0.7166$ | | |
| $r_7 = 35.9373$ | | | |
| | $d_7 = 2.6990$ | $n_4 = 1.58267$ | $\nu_4 = 46.33$ |
| $r_8 = -37.5401$ | | | |
| | $d_8 = 1.8706$ | | |
| $r_9 = \infty$ (stop) | | | |
| | $d_9 = D$ (variable) | | |
| $r_{10} = -72.2003$ | | | |
| | $d_{10} = 2.9984$ | $n_5 = 1.50050$ | $\nu_5 = 56.68$ |
| $r_{11} = -24.4040$ (aspherical surface) | | | |
| | $d_{11} = 0.1945$ | | |
| $r_{12} = -64.1976$ | | | |
| | $d_{12} = 1.2972$ | $n_6 = 1.50050$ | $\nu_6 = 56.68$ |
| $r_{13} = 109.3869$ | | | |
| | $d_{13} = 6.0675$ | | |
| $r_{14} = -12.8938$ | | | |
| | $d_{14} = 1.5986$ | $n_7 = 1.77250$ | $\nu_7 = 49.66$ |
| $r_{15} = -35.0060$ | | | | aspherical surface coefficients

$K - 1.0000, A = 0, B = 0.18529 \times 10^{-4}$
$C = 0.72277 \times 10^{-8}, D = -0.81442 \times 10^{-9}$

| f | 39.332 | 55.160 | 73.335 |
|---|---|---|---|
| D | 12.924 | 6.717 | 2.894 |
| $f_B$ | 7.447 | 22.446 | 39.668 |

$(r_{II2a} + r_{II2b})/(r_{II2a} - r_{II2b}) = -0.260$
$f_{II}/f_{II2} = -0.039, |f_{III}/f_{II}| = 2.541$
$|f_{III}/f_{II}| = 2.840,$
$(r_{III b} - r_{II2a})/(r_{III b} + r_{II2a}) = -0.449$
$(r_{I2b} - r_{I3a})/(r_{I2b} + r_{I3a}) = -1.166$

Embodiment 3

Figure 3:
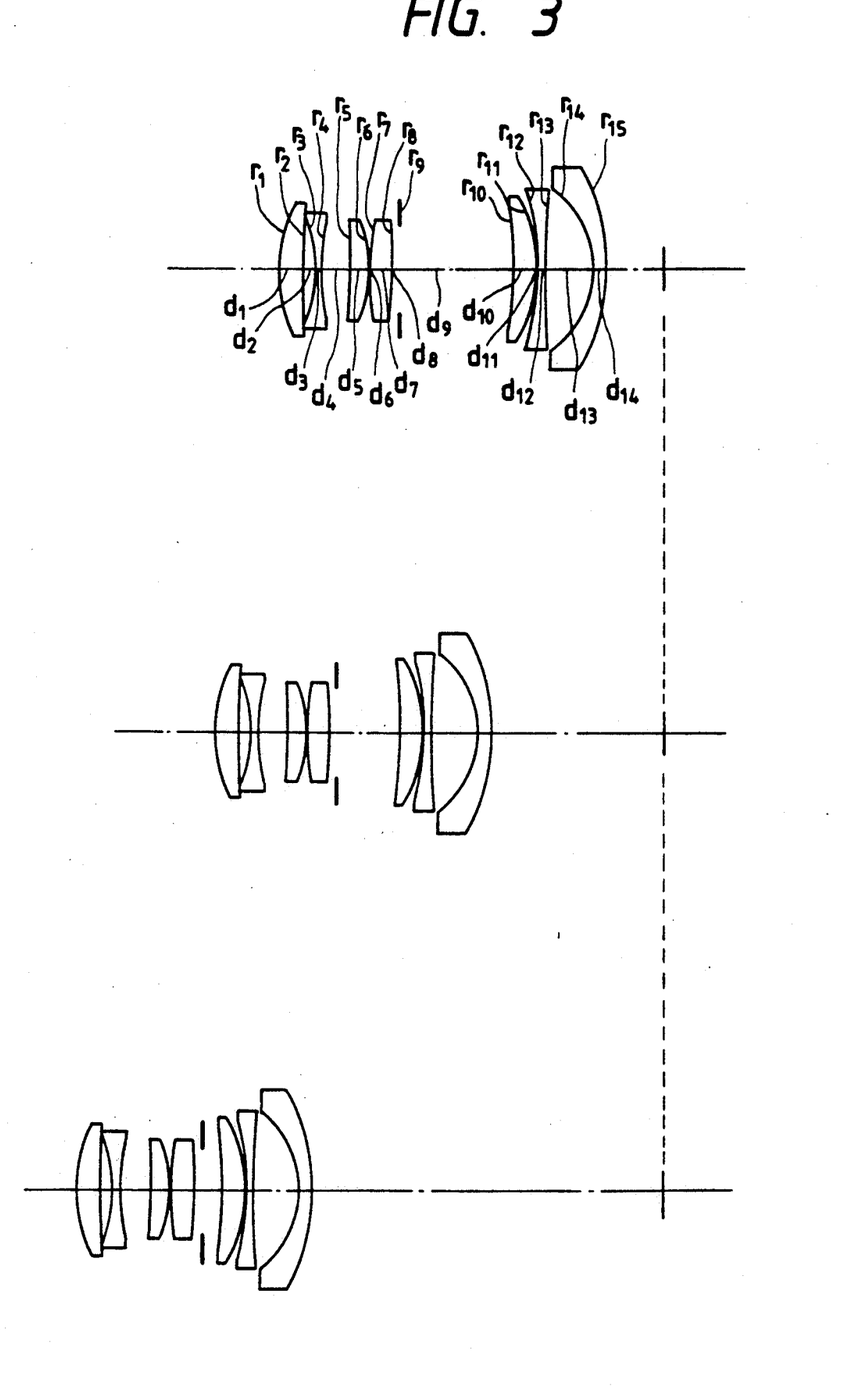

$f = 41.425 \sim 77.191$ mm, F/3.552~F/6.619
$2\omega = 148.688° \sim 124.852°$

| | | | |
|---|---|---|---|
| $r_1 = 20.6545$ | | | |
| | $d_1 = 3.0988$ | $n_1 = 1.69680$ | $\nu_1 = 56.49$ |
| $r_2 = 477.6797$ | | | |
| | $d_2 = 1.4515$ | | |
| $r_3 = -23.4282$ | | | |
| | $d_3 = 1.0613$ | $n_2 = 1.83400$ | $\nu_2 = 37.16$ |
| $r_4 = 38.3809$ | | | |
| | $d_4 = 3.8404$ | | |
| $r_5 = -150.0055$ | | | |
| | $d_5 = 2.4903$ | $n_3 = 1.50137$ | $\nu_3 = 56.40$ |
| $r_6 = -16.3299$ | | | |
| | $d_6 = 0.1500$ | | |
| $r_7 = 56.2737$ | | | |
| | $d_7 = 3.0000$ | $n_4 = 1.65830$ | $\nu_4 = 53.44$ |
| $r_8 = -59.1896$ | | | |
| | $d_8 = 0.8000$ | | |
| $r_9 = \infty$ (stop) | | | |
| | $d_9 = D$ (variable) | | |
| $r_{10} = -67.9217$ | | | |
| | $d_{10} = 2.8000$ | $n_5 = 1.50050$ | $\nu_5 = 56.68$ |
| $r_{11} = -21.1147$ (aspherical surface) | | | |
| | $d_{11} = 0.2200$ | | |
| $r_{12} = -36.7614$ | | | |
| | $d_{12} = 1.2000$ | $n_6 = 1.50050$ | $\nu_6 = 56.68$ |
| $r_{13} = 161.1736$ | | | |
| | $d_{13} = 5.9516$ | | |
| $r_{14} = -12.8637$ | | | |
| | $d_{14} = 1.6000$ | $n_7 = 1.77250$ | $\nu_7 = 49.66$ |
| $r_{15} = -26.4900$ | | | | aspherical surface coefficients

$K = 1.0000, A = 0, B = -0.17451 \times 10^{-4}$
$C = 0.44891 \times 10^{-7}, D = -0.12213 \times 10^{-8}$

| f | 41.425 | 55.107 | 77.191 |
|---|---|---|---|
| D | 15.072 | 8.603 | 3.000 |
| $f_B$ | 7.533 | 21.818 | 44.874 |

$(r_{II2a} + r_{II2b})/(r_{II2a} - r_{II2b}) = -0.629$
$f_{II}/f_{II2} = 0.007, |f_{III}/f_{II}| = 1.788$
$|f_{III}/f_{II}| = 1.778,$
$(r_{III b} - r_{II2a})/(r_{III b} + r_{II2a}) = -0.270$
$(r_{I2b} - r_{I3a})/(r_{I2b} + r_{I3a}) = -1.688$

Embodiment 4

Figure 4:
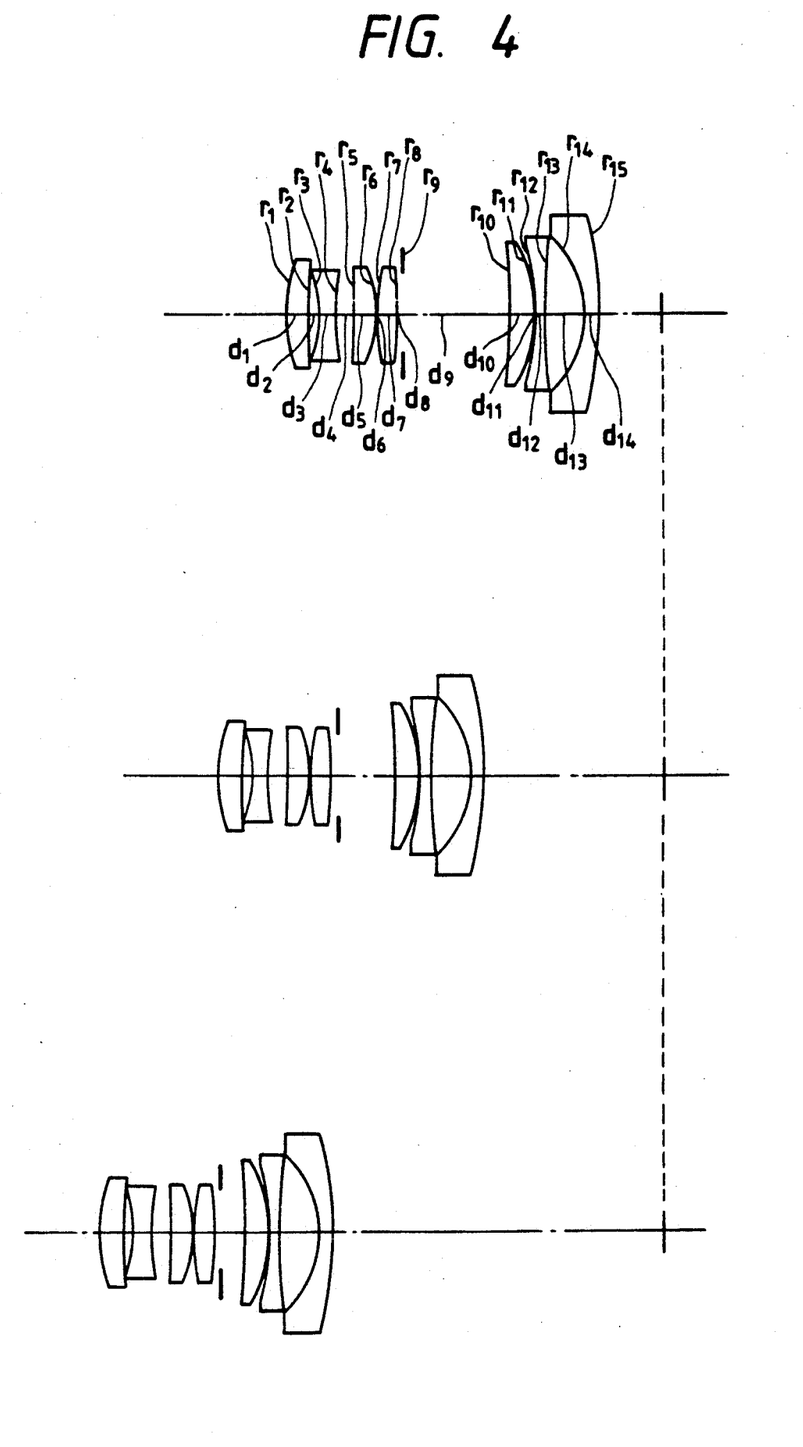

$f = 39.370 \sim 73.352$ mm, F/4.000~F/7.453
$2\omega = 147.136 \sim 122.424$

| | | | |
|---|---|---|---|
| $r_1 = 18.8903$ | | | |
| | $d_1 = 2.9999$ | $n_1 = 1.61272$ | $\nu_1 = 58.75$ |

-continued

Embodiment 4

| | | | |
|---|---|---|---|
| $r_2 = 137.7096$ | | | |
| | $d_2 = 1.3977$ | | |
| $r_3 = -19.7917$ | | | |
| | $d_3 = 2.1268$ | $n_2 = 1.83400$ | $\nu_2 = 37.16$ |
| $r_4 = 42.6413$ | | | |
| | $d_4 = 2.3807$ | | |
| $r_5 = -398.6859$ | | | |
| | $d_5 = 2.9998$ | $n_3 = 1.49831$ | $\nu_3 = 65.03$ |
| $r_6 = -14.8689$ | | | |
| | $d_6 = 0.1498$ | | |
| $r_7 = 35.7759$ | | | |
| | $d_7 = 2.6999$ | $n_4 = 1.54072$ | $\nu_4 = 47.20$ |
| $r_8 = -47.1805$ | | | |
| | $d_8 = 1.6400$ | | |
| $r_9 = \infty$ (stop) | | | |
| | $d_9 = D$ (variable) | | |
| $r_{10} = -112.5633$ | | | |
| | $d_{10} = 2.9997$ | $n_5 = 1.50050$ | $\nu_5 = 56.68$ |
| $r_{11} = -21.7957$ (aspherical surface) | | | |
| | $d_{11} = 0.1995$ | | |
| $r_{12} = -40.7167$ | | | |
| | $d_{12} = 1.3497$ | $n_6 = 1.50050$ | $\nu_6 = 56.68$ |
| $r_{13} = 108.9122$ | | | |
| | $d_{13} = 5.3868$ | | |
| $r_{14} = -13.8486$ | | | |
| | $d_{14} = 1.5999$ | $n_7 = 1.69100$ | $\nu_7 = 54.84$ |
| $r_{15} = -48.4057$ | | | | aspherical surface coefficients
$K = 1.0000, A = 0, B = -0.76641 \times 10^{-5}$
$C = 0.18777 \times 10^{-6}, D = -0.18097 \times 10^{-8}$

| f | 39.370 | 54.015 | 73.352 |
|---|---|---|---|
| D | 11.149 | 4.791 | 0.284 |
| $f_B$ | 8.015 | 22.716 | 42.130 |

$(r_{II2a} + r_{II2b})/(r_{II2a} - r_{II2b}) = -0.456$
$f_{II}/f_{II2} = -0.054, |f_{II1}/f_{II}| = 1.754$
$|f_{II2}/f_{II}| = 1.939$,
$(r_{III b} - r_{II2a})/(r_{III b} + r_{II2a}) = -0.303$
$(r_{II2b} - r_{I3a})/(r_{II2b} + r_{I3a}) = -1.240$

Embodiment 5

Figure 5:
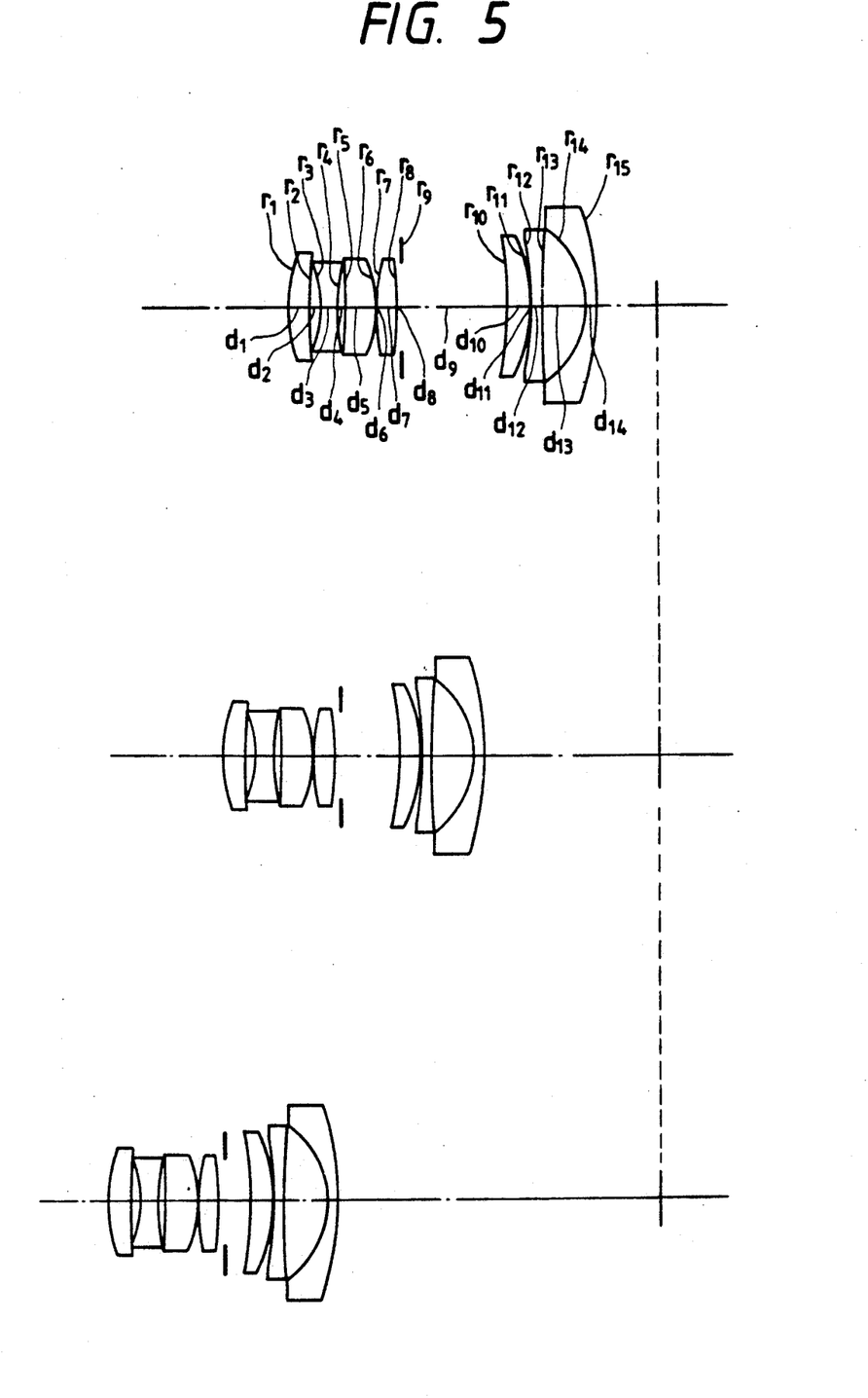
Figure 6:
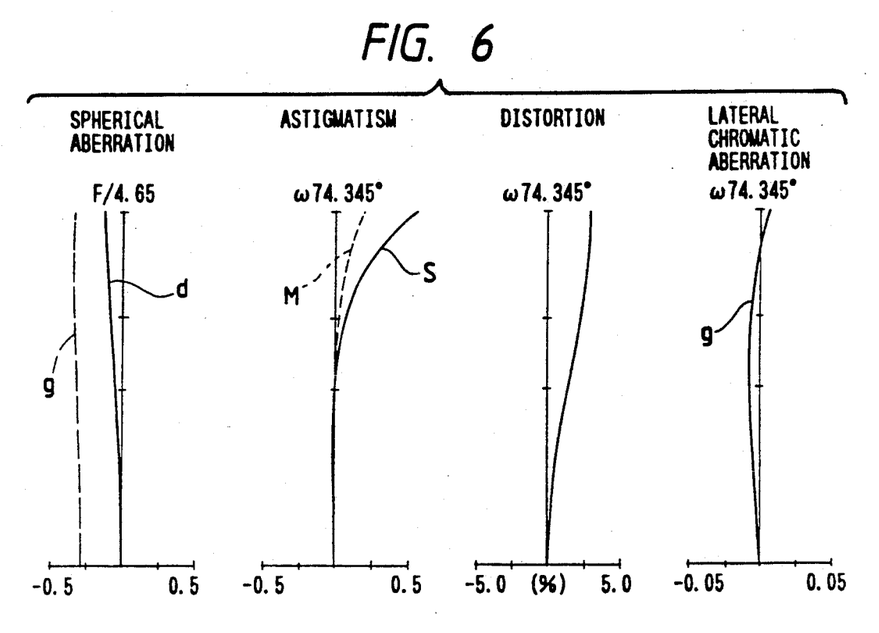
FIG. 6, FIG. 7 and FIG. 8 show graphs illustrating aberration characteristics at the wide position, intermediate focal length and tele position of the Embodiment 1 of the present invention.
Figure 7:
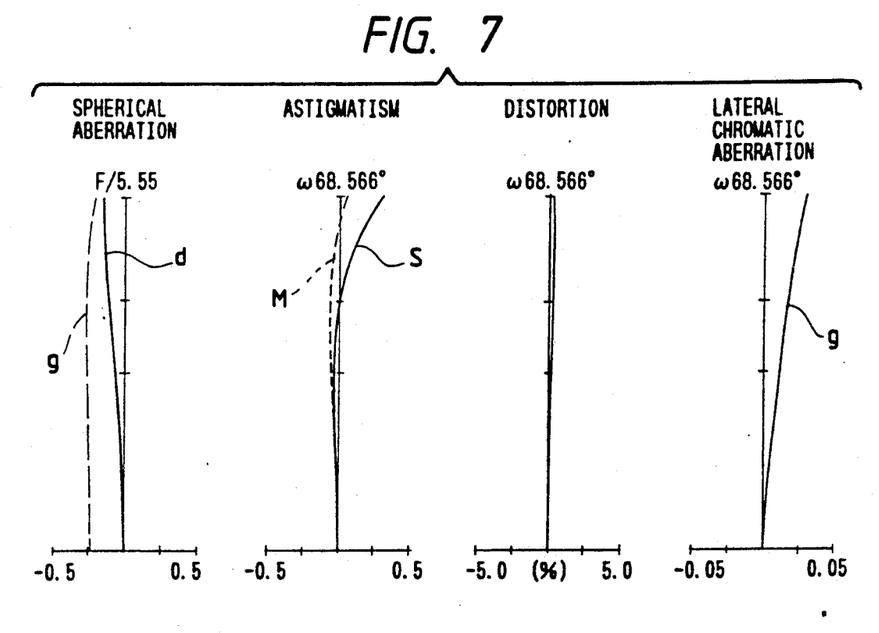
Figure 8:
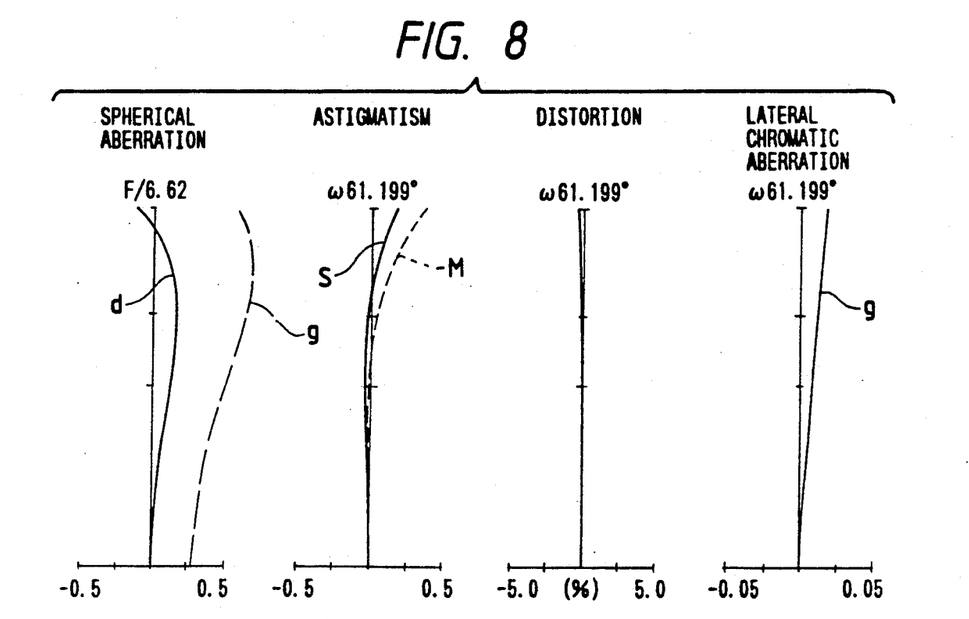
Figure 9:
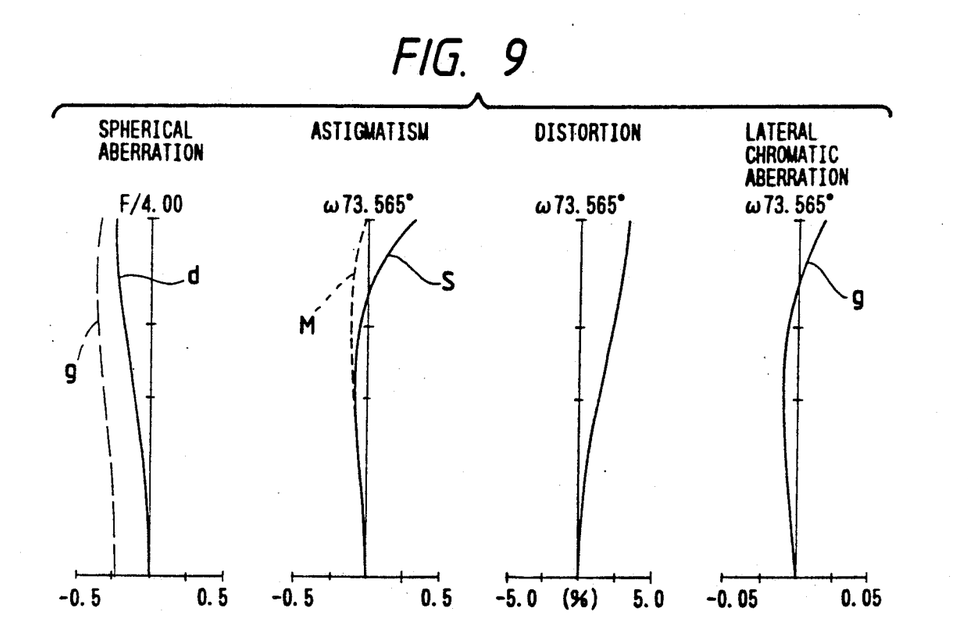
FIG. 9, FIG. 10 and FIG. 11 show graphs illustrating aberration characteristics at the wide position, intermediate focal length and tele position of the Embodiment 2 of the present invention.
Figure 10:
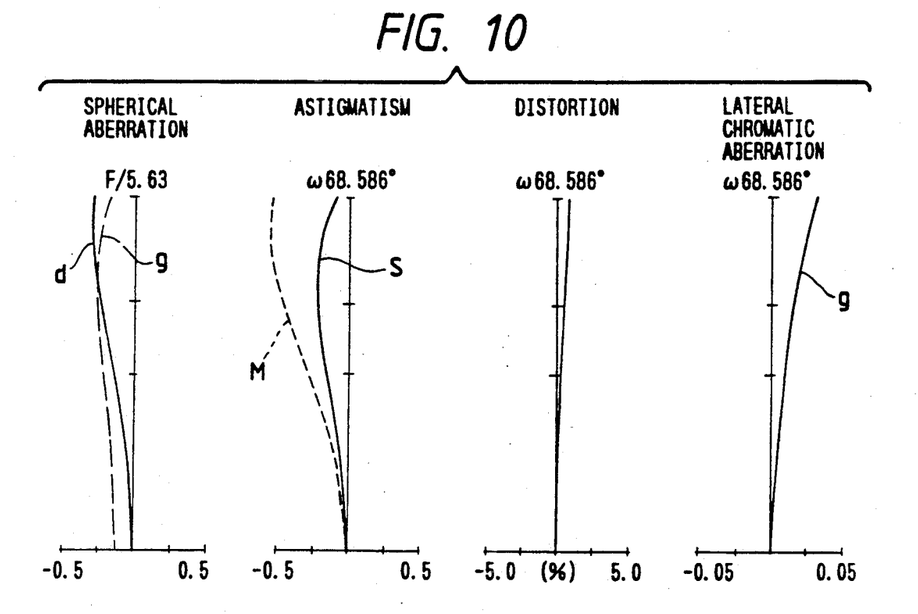
Figure 11:
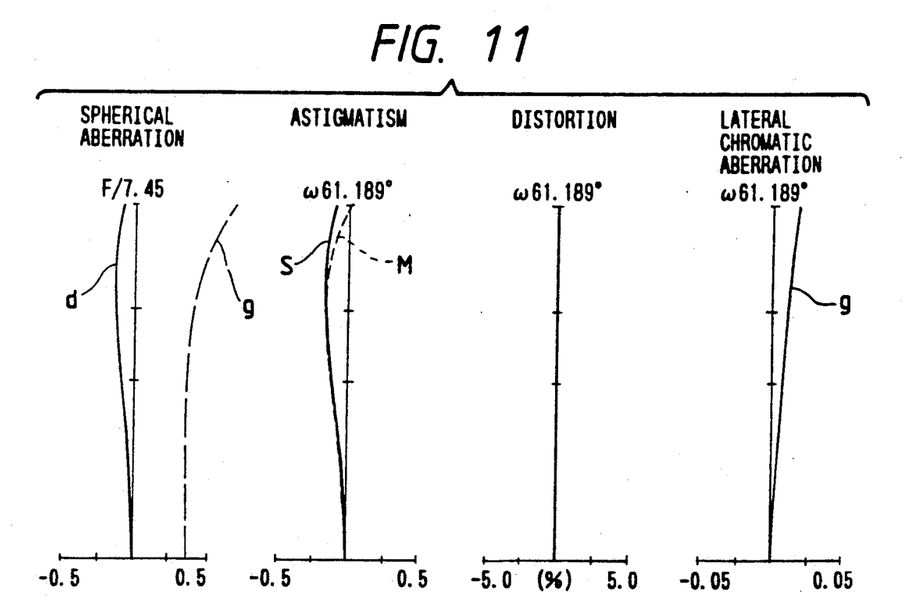
Figure 12:
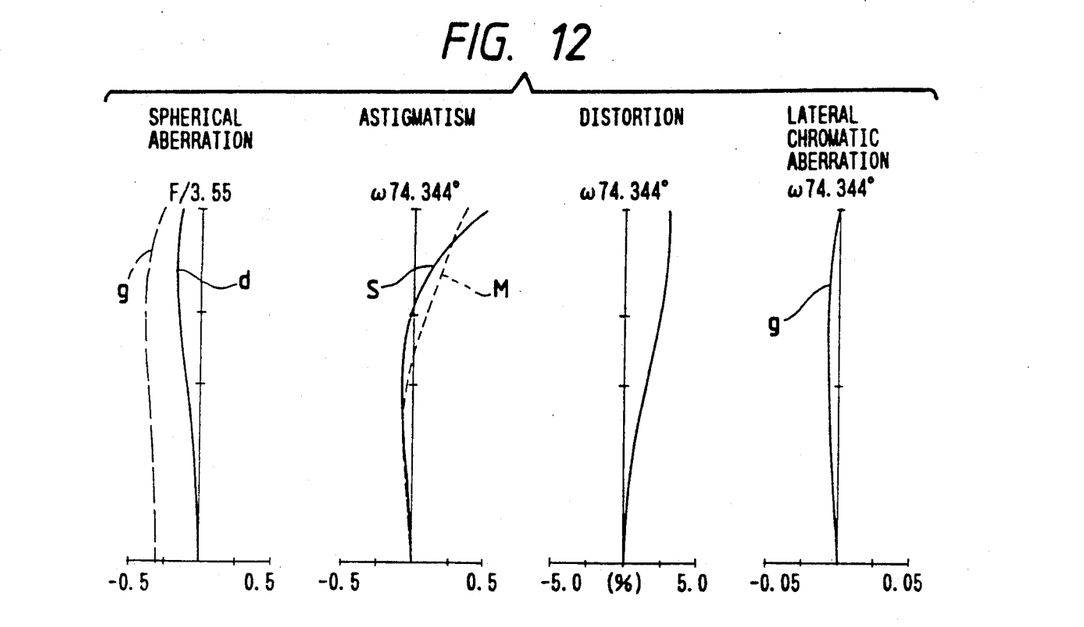
FIG. 12, FIG. 13 and FIG. 14 show curves illustrating aberration characteristics at the wide position, intermediate focal length and tele position of the Embodiment 3 of the present invention.
Figure 13:
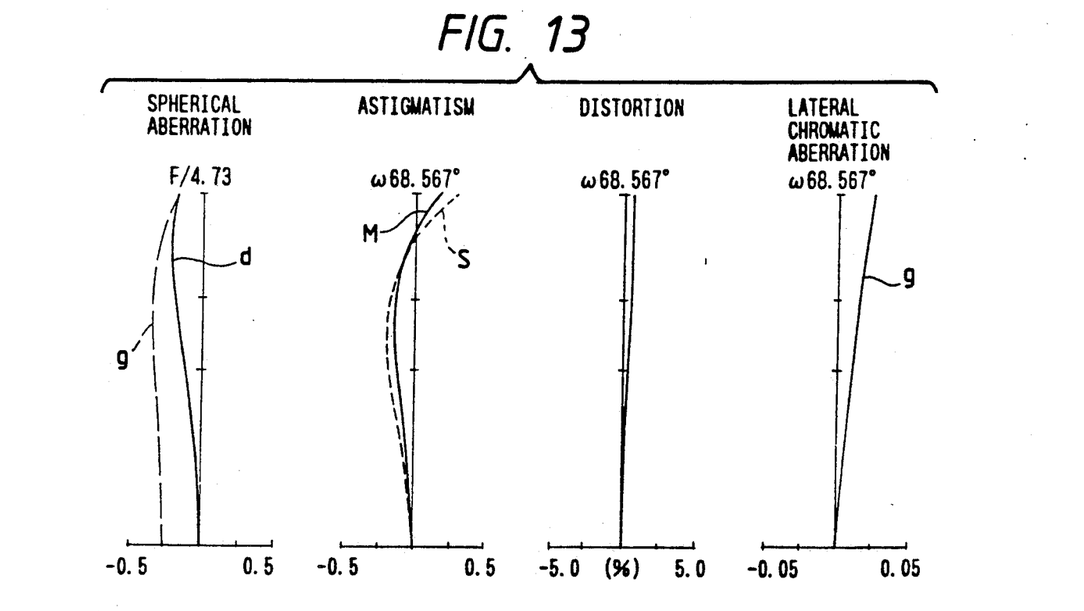
Figure 14:
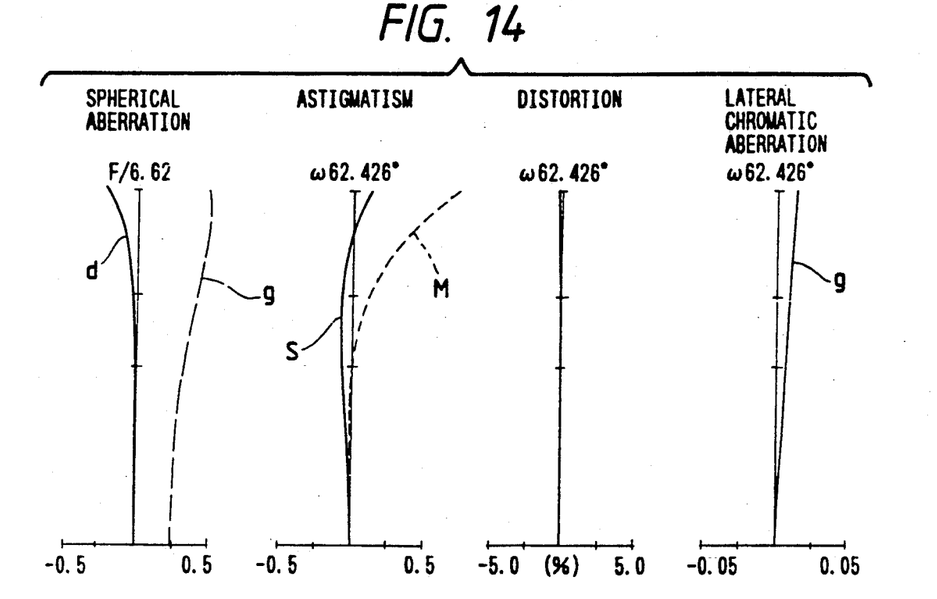
Figure 15:
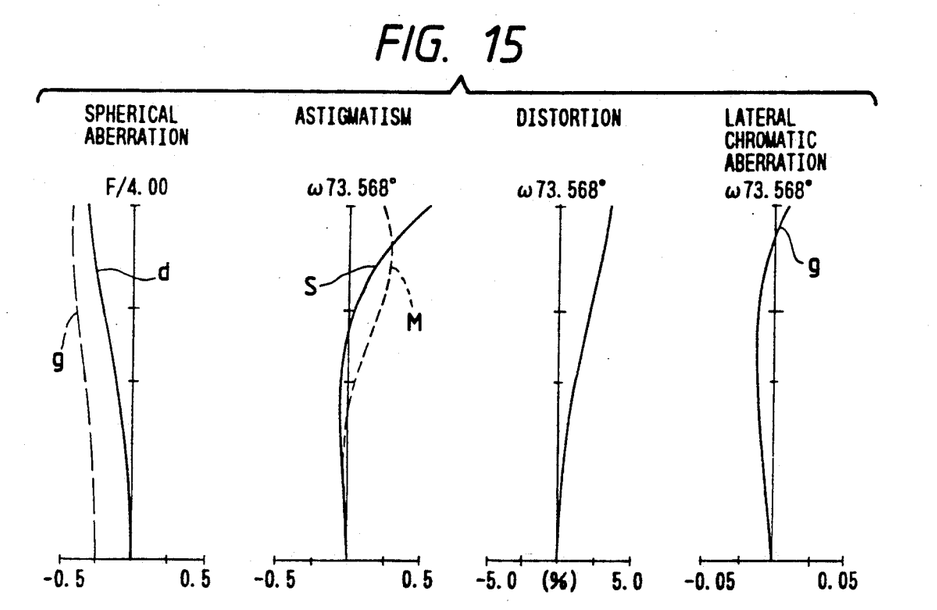
FIG. 15, FIG. 16 and FIG. 17 show curves illustrating aberration characteristics at the wide position, intermediate focal length and tele position of the Embodiment 4 of the present invention.
Figure 16:
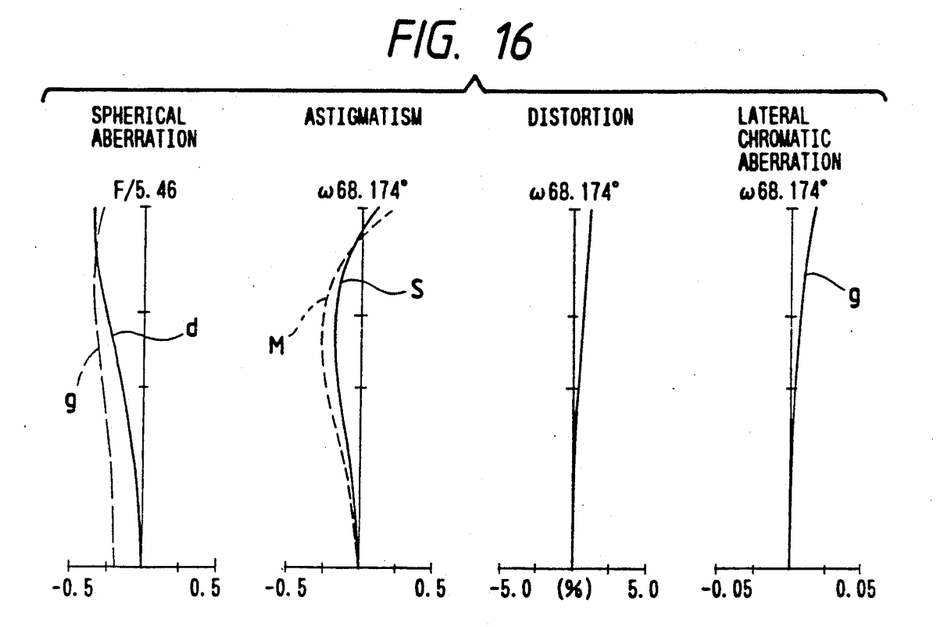
Figure 17:
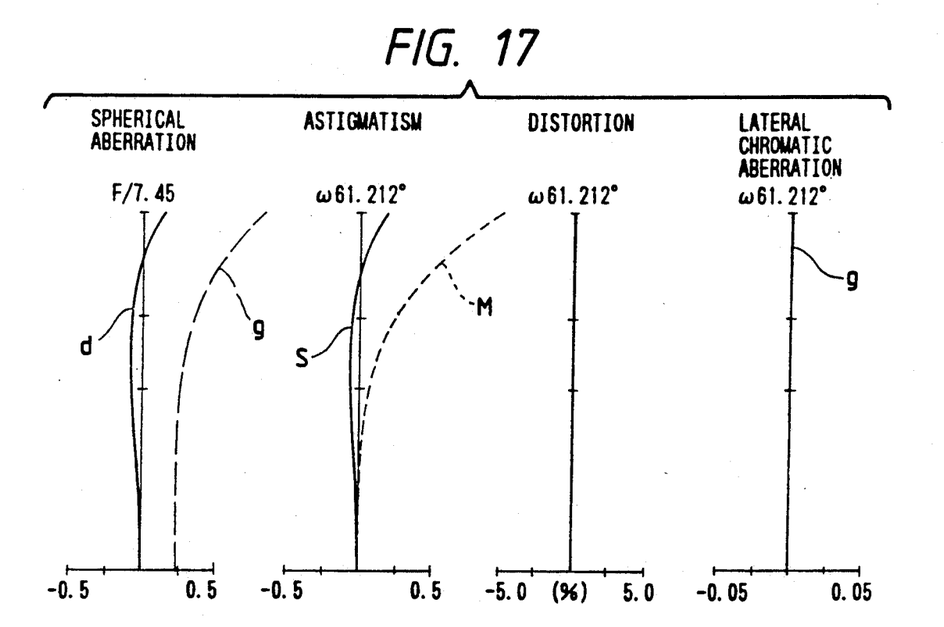
Figure 18:
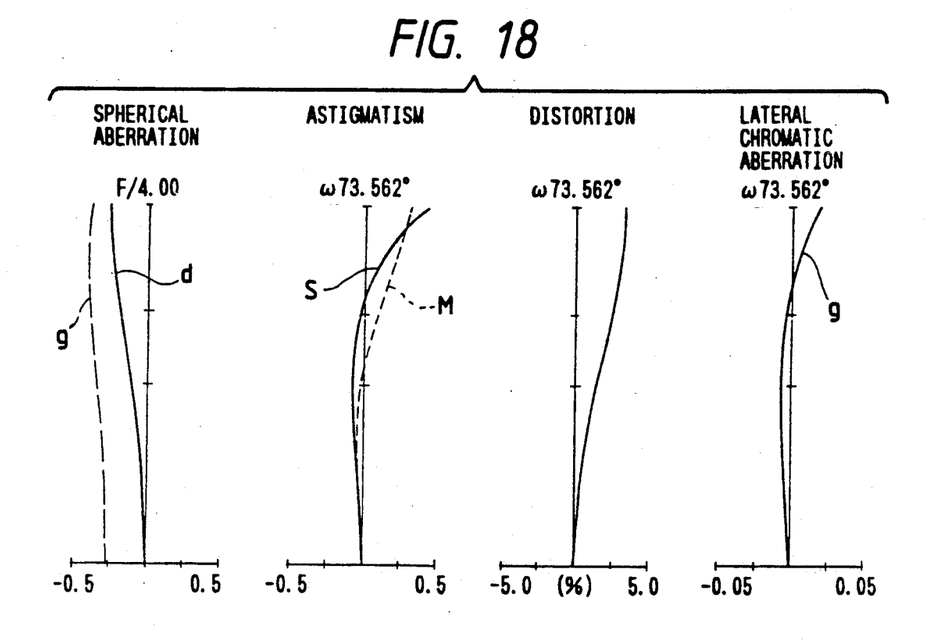
FIG. 18, FIG. 19 and FIG. 20 show graphs visualizing aberration characteristics at the wide position, intermediate focal length and tele position of the Embodiment 5 of the present invention.
Figure 19:
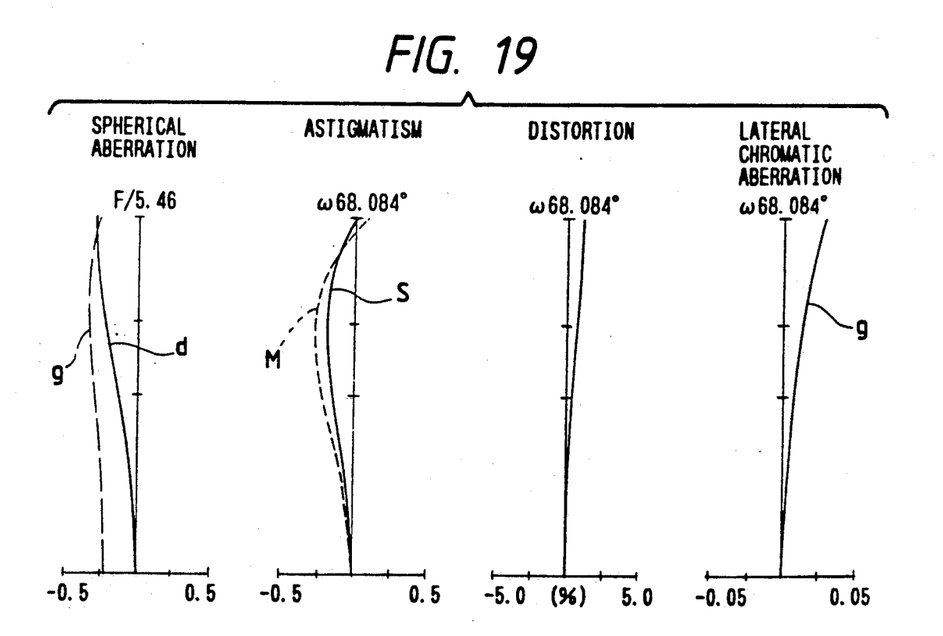
Figure 20:
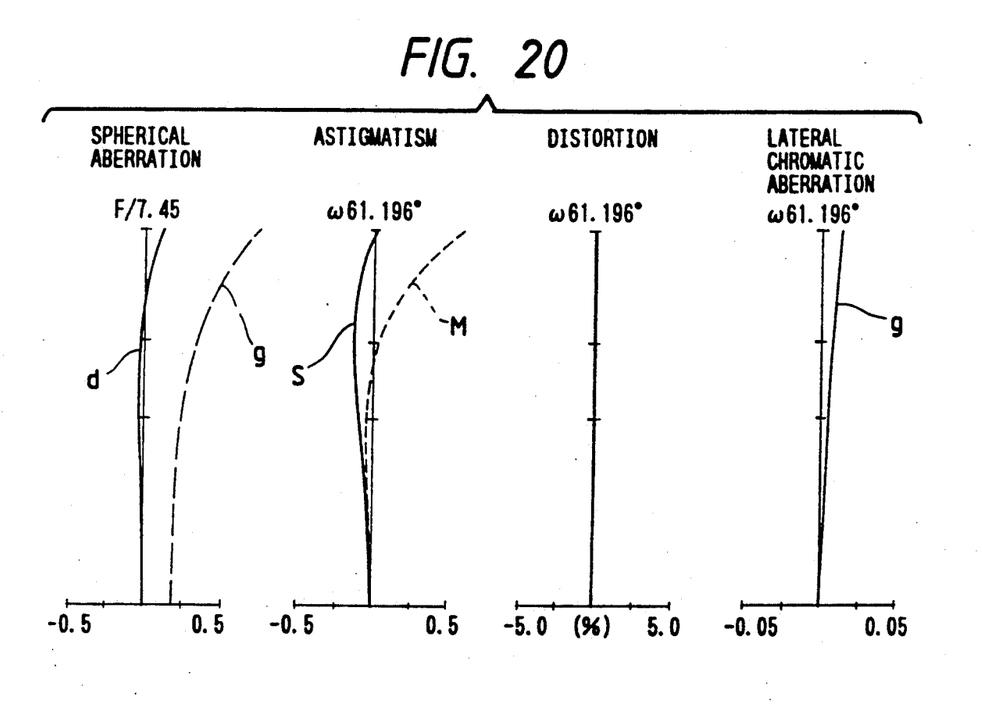

$f = 39.343 \sim 73.324$ mm, $F/3.997 \sim F/7.450$
$2\omega = 147.124° \sim 122.392°$

| | | | |
|---|---|---|---|
| $r_1 = 19.4615$ | | | |
| | $d_1 = 3.0000$ | $n_1 = 1.61272$ | $\nu_1 = 58.75$ |
| $r_2 = 135.6113$ | | | |
| | $d_2 = 1.4303$ | | |
| $r_3 = -19.1830$ | | | |
| | $d_3 = 2.2200$ | $n_2 = 1.83400$ | $\nu_2 = 37.16$ |
| $r_4 = 46.1096$ | | | |
| | $d_4 = 1.0000$ | | |
| $r_5 = -230.8738$ | | | |
| | $d_5 = 4.5068$ | $n_3 = 1.49831$ | $\nu_3 = 65.03$ |
| $r_6 = -14.9166$ | | | |
| | $d_6 = 0.1500$ | | |
| $r_7 = 35.9315$ | | | |
| | $d_7 = 2.7000$ | $n_4 = 1.54072$ | $\nu_4 = 47.20$ |
| $r_8 = -39.9827$ | | | |
| | $d_8 = 1.5999$ | | |
| $r_9 = \infty$ (stop) | | | |
| | $d_9 = D$ (variable) | | |
| $r_{10} = -60.7536$ | | | |
| | $d_{10} = 3.0000$ | $n_5 = 1.50050$ | $\nu_5 = 56.68$ |
| $r_{11} = -21.3976$ | | | |
| | $d_{11} = 0.2000$ | | |
| $r_{12} = -46.4027$ (aspherical surface) | | | |
| | $d_{12} = 1.3500$ | $n_6 = 1.50050$ | $\nu_6 = 56.68$ |
| $r_{13} = 188.2538$ | | | |
| | $d_{13} = 5.6966$ | | |
| $r_{14} = -12.8386$ | | | |
| | $d_{14} = 1.6000$ | $n_7 = 1.69100$ | $\nu_7 = 54.84$ |
| $r_{15} = -38.7289$ | | | | aspherical surface coefficients
$K = 1.0000, A = 0, B = 0.13412 \times 10^{-4}$
$C = -0.20830 \times 10^{-7}, D = 0.95091 \times 10^{-9}$

| f | 39.343 | 53.771 | 73.324 |
|---|---|---|---|
| D | 13.289 | 7.086 | 2.575 |
| $f_B$ | 7.814 | 22.275 | 41.875 |

$(r_{II2a} + r_{II2b})/(r_{II2a} - r_{II2b}) = -0.605$
$f_{II}/f_{II2} = -0.058, |f_{II1}/f_{II}| = 2.132$
$|f_{II2}/f_{II}| = 2.459$,
$(r_{III b} - r_{II2a})/(r_{III b} + r_{II2a}) = -0.369$
$(r_{II2b} - r_{I3a})/(r_{II2b} + r_{I3a}) = -1.499$ wherein the reference symbols $r_1, r_2,...$ represent the radii of curvature on the surfaces of the respective lens components, the reference symbols $d_1, d_2, ...$ designate the thicknesses of the respective lens components and the airspaces reserved therebetween, the reference symbols $n_1, n_2,...$ denote the refractive indices of the respective lens components, and the reference symbols $\nu_1, \nu_2,...$ represent the Abbe's numbers of the respective lens components.

In the embodiments described above, the lens components which have $n_5$, $\nu_5$ and $n_6$, $\nu_6$ are fabricated from a plastic material.

When the direction of the optical axis is taken as the z axis, the direction perpendicular to the optical axis is taken as the y axis and the radius of curvature on an aspherical surface of interest as measured in the vicinity of the optical axis is represented by R, the shapes of the aspherical surfaces used in the embodiments described above are expressed by the following formula:

$$z = \frac{y^2}{R + \sqrt{R^2 - (1+k)y^2}} + Ay^2 + By^4 + Cy^6 + Dy^8$$

wherein the reference symbol k represents the conical coefficient, and the reference symbols A, B, C and D designates the aspherical surface coefficients.

As is understood from the foregoing description, the zoom lens system according to the present invention is designed for a high vari-focal ratio of 2, and nevertheless has excellent optical performance and a compact design, and can be manufactured at a low cost.

I claim:

1. A zoom lens system comprising in the order from the object side: a front lens unit comprising a positive meniscus lens component having a convex surface on the object side, a negative lens component and at least one positive lens component, and having a positive refractive power as a whole, and a rear lens unit comprising a positive lens component, a biconcave lens component and a negative meniscus lens component having a convex surface on the image side, and having a negative refractive power as a whole; and adapted so as to perform variation of focal length by varying the airspace reserved between said front lens unit and said rear lens unit; the positive lens component and the biconcave lens component arranged in said rear lens unit being fabricated from plastic material and comprising at least one aspherical surface having positive refractive power strengthened as the surface portions are farther from the optical axis, and said rear lens unit being designed so as to satisfy the following conditions (1) and (2):

$$-1 < (r_{II2a} + r_{II2b})/(r_{II2a} - r_{II2b}) < 0.2 \quad (1)$$

$$-0.15 \leq f_{II}/f_{II12} < 0.15 \qquad (2)$$

wherein the reference symbols $r_{II2a}$ and $r_{II2b}$ represent the radii of curvature on the object side surface and the image side surface respectively of the biconcave lens component arranged in said rear lens unit, the reference symbol $f_{II}$ designates the focal length of said rear lens unit, and the reference symbol $f_{II12}$ denotes the total focal length of two lens components fabricated from plastic material.

2. A zoom lens system according to claim 1 wherein said rear lens unit is designed so as to satisfy the following condition (2'):

$$-0.15 < f_{II}/f_{II12} < 0.03 \qquad (2')$$

3. A zoom lens system according to claim 1 or 2 wherein said two plastic lens components are fabricated from one and the same substance, and said rear lens unit is designed so as to satisfy the following conditions (3), (4) and (5):

$$1 \geq |f_{II1}/f_{II}| \geq 4 \qquad (3)$$

$$1 \geq |f_{II2}/f_{II}| \geq 4 \qquad (4)$$

$$-0.8 < (r_{II1b} - r_{II2a})/(r_{II1b} + r_{II2a}) < 0 \qquad (5)$$

wherein the reference symbol $f_{II1}$ represent the focal length of the positive plastic lens component arranged in said rear lens unit, the reference symbol $f_{II2}$ designates the focal length of the biconcave plastic lens component arranged in said rear lens unit and the reference symbol $r_{II1b}$ denotes the radius of curvature on the image side surface of the positive plastic lens component arranged in said rear lens unit.

4. A zoom lens system according to claim 3 wherein said front lens unit comprises, in the order from the object side, a positive lens component having a convex surface on the object side, a negative lens component and two positive lens components both having convex surfaces on the image side, and is designed so as to satisfy the following condition (6):

$$-2.4 < (r_{I2b} - r_{I3a})/(r_{I2b} + r_{I3a}) \qquad (6)$$

wherein the reference symbol $r_{I2b}$ represents the radius of curvature on the image side surface of the negative lens component arranged in said front lens unit, and the reference symbol $r_{I3a}$ designates the radius of curvature on the object side surface of the positive lens component arranged on the image side of the negative lens component and adjacent thereto in said front lens unit.

5. A zoom lens system according to claim 4 wherein said front lens unit is designed so as to satisfy the following condition (6'):

$$-2.4 < (r_{I2b} - r_{I3a})/(r_{I2b} + r_{I3a}) < -0.5 \qquad (6')$$

* * * * *